United States Patent Office 3,430,488
Patented Mar. 4, 1969

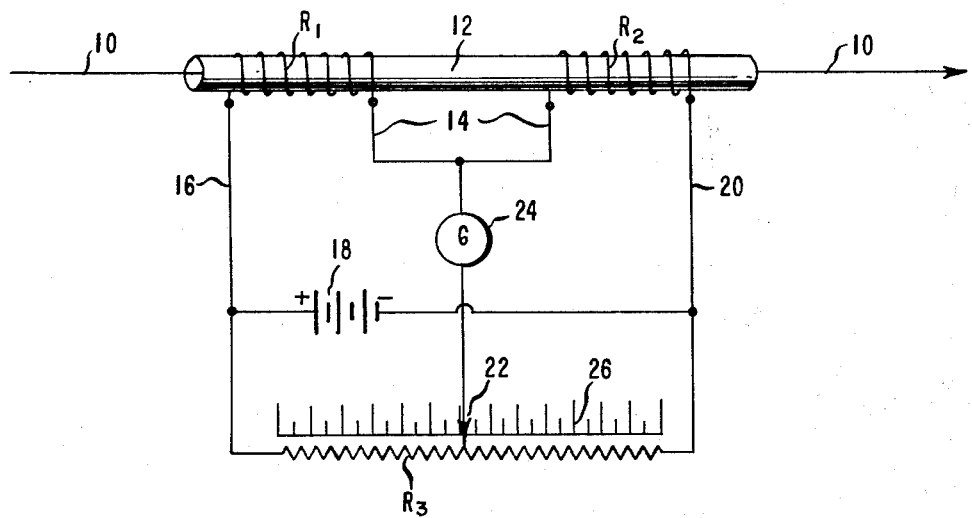

3,430,488
CALORIMETRIC YARN DENIERING APPARATUS
John Seymour Seney, Seaford, Del., assignor to E. I.
du Pont de Nemours and Company, Wilmington, Del.,
a corporation of Delaware
Filed Feb. 7, 1967, Ser. No. 614,454
U.S. Cl. 73—160                              5 Claims
Int. Cl. G01l 5/04

ABSTRACT OF THE DISCLOSURE

An apparatus for measuring the denier of a yarn moving at a constant speed employs a calorimetric principle based on heat absorbed and transported by the yarn. A pair of electrically energized wire coils which are axially spaced and serially connected function to supply and detect heat absorbed by the yarn moving through the coils. A bridge circuit measures the changes in the ratio of coil resistance as a result of heat transported by the yarn and this ratio is then related to yarn denier.

Background of the invention

This invention relates generally to determinations of the mass per unit length of elongated structures and is more particularly concerned with a device for continuously measuring and recording values of denier of a moving yarn.

The traditional method for measuring denier is to weigh a known length of yarn and compute the denier as the weight in milligrams of 9 meters of yarn. This method is tedious and difficult to carry out continuously. Many continuous methods are known in the art. Some employ a capacitor through which the yarn is moved and measure changes in capacitance which are related to denier changes. Other methods employ a light source and photo-sensitive device between which the yarn is passed and measure variations in the width of the shadow cast by the yarn. Still others use the obsorption of radiation, such as beta-rays, by the yarn and some make use of pneumatic effects. Although excellent in many respects, the known denier gauges have one or more disadvantages including excessive complexity or cost of apparatus, sensitivity to moisture, or variability due to changes in cross-sectional shape of the yarn.

Summary of the invention

The primary object of this invention is to provide a simple, inexpensive device to measure denier continuously for a running yarn without contacting or breaking it and in a way that is not sensitive to changes in cross-sectional shape.

This object is accomplished by passing a yarn at constant speed through a thin-walled insulating tube surrounded by two spaced temperature sensitive resistance wire coils. An electric current is passed through the two coils in series. A bridge circuit measures the changes in the ratio of resistances of the coils as a result of heat transported by the yarn. This ratio is related to yarn denier.

Brief description of the drawing

The drawing is an isometric sketch of a yarn denier detector with its associated schematic circuit diagram.

Description of the preferred embodiment

Referring to the drawing a yarn 10 is passed through an elongated tube 12 at constant speed. Two resistance wire coils $R_1$, $R_2$, are wound around tube 12 at two separate locations. Tube 12 is made of treated paper to provide stiffening and thermal and electrical insulating properties. The tube is approximately ¼ cm. in outside diameter with a wall thickness of approximately 0.01 cm. which is of insufficient thickness to impede heat transfer between the coils and the yarn. However because of the spacing between coils $R_1$, $R_2$ on tube 12 the insulating properties of the tube tend to minimize the amount of heat conducted directly along the tube between the coils. Coils $R_1$, $R_2$, are identical and are wound of 500 turns of 0.005 cm. Balco temperature sensitive resistance wire (purchased from Wilbury Driver Co.). The inner terminals of coils $R_1$, $R_2$, are connected by means of wire 14. The outer terminal of coil $R_1$ is connected by means of wire 16 to one terminal of battery 18 and one terminal of slide wire precision potentiometer $R_3$. The outside terminal of coil $R_2$ is connected by means of wire 20 to the remaining terminal of battery 18 and the remaining outside terminal of potentiometer $R_3$. A galvanometer 24 is connected between wire 14 and the sliding contact 22 of potentiometer $R_3$. A scale 26 is provided behind contact 22.

In this embodiment battery 18 is a 30 volt storage battery, potentiometer $R_3$ is a 2000 ohm precision slide wire, model LU from Beckman Instrument Co., and galvanometer 24 is a Model 2310–C from Leeds & Northrup Co.

In operation, current flowing from battery 18 through coils $R_1$, $R_2$, causes them to heat up to approximately 20° centigrade above ambient temperature. As yarn is passed at constant speed through tube 12 heat is withdrawn from coil $R_1$ and transported to coil $R_2$ in proportion to the mass per unit length of the yarn. The temperatures of $R_1$ and $R_2$ are changed and therefore the ratio of the resistances of these two coils is changed. This change in ratio of resistance is detected by galvanometer 24. By moving contact 22 the galvanometer reading can be reduced to zero. The scale 26, provided behind sliding contact 22, is calibrated by passing yarns of known denier through the tube at a fixed speed, reducing the galvanometer reading to zero for each yarn and marking the scale in units of yarn denier. Thus when a yarn of unknown denier is passed through the tube at the same speed, the position of contact 22, required to reduce the galvanometer to zero, can be read on scale 26 in terms of yarn denier. In addition, contact 22 can be set at the average denier for a yarn being passed through tube 12 and deflections of the galvanometer used to detect variations in denier from this average value.

Thus a simple, reliable and inexpensive device is provided for determining yarn denier continuously. Many modifications and additions will be obvious to one skilled in the art. These might include the substitution of an automatic recorder for galvanometer 24; conventional computer circuitry in association with the galvanometer or the recorder designed to furnish indices of yarn variability; or an automatic self-balancing potentiometer in place of galvanometer 24 and part of slide wire potentiometer $R_3$. The galvanometer or potentiometer signal might be used to regulate a yarn spinning process, such as by varying draw-off roll speed, in such a way as to control denier. In addition, simple modifications of coils, $R_1$, $R_2$ and of tube 12 could be made to provide a slit along the length of the coil and tube arrangement so that yarn could be inserted in the tube without the need for breaking the yarn and stringing it through the tube. Furthermore, the wire used in the coils may be composed of any of a broad selection of materials with resistance sensitive to temperature such as iron, nickel, copper, vapor deposited films of metals or oxides, and silicone metal slices. In fact, the coils could be composed of temperature insensitive material and their temperature difference measured by means of devices such as thermocouples or thermistors. It is apparent that other changes and modifications may be made in the disclosed monitoring apparatus without departing from the spirit of the present invention which is therefore intended to be limited only by the scope of the appended claims.

What is claimed is:
1. An apparatus for measuring the denier of a yarn moving at a constant speed, said apparatus comprising:
   (a) a pair of wire coils, said coils being axially spaced and serially connected;
   (b) a source of electrical power connected to said coils for supplying an electrical current through said coils sufficient to heat said coils; and
   (c) means connected to said coils for measuring the temperature difference between said coils as said yarn is moved axially through said coils at a constant speed.
2. The apparatus of claim 1 wherein said source of electric power is a direct current source.
3. The apparatus of claim 1 wherein said coils are wound on a tube having thermal and electrical insulating properties, said yarn being passed axially through said tube.
4. The apparatus of claim 1 wherein said coils are identical.
5. An apparatus for measuring the denier of a yarn moving at a constant speed, said apparatus comprising:
   (a) a pair of temperature sensitive resistance wire coils, said coils being axially spaced and serially connected;
   (b) a source of electrical power connected to said coils for supplying an electrical current through said coils sufficient to heat said coils; and
   (c) means connected to said coils for measuring the ratio of resistance of said coils as said yarn is moved axially through said coils at a constant speed.

References Cited

UNITED STATES PATENTS

| | | | |
|---|---|---|---|
| 1,869,336 | 7/1932 | De Forest | 73—15 XR |
| 2,477,526 | 7/1949 | Perley | 73—15 |
| 2,524,936 | 10/1950 | Smith | 73—160 |
| 2,800,793 | 7/1957 | Oliver | 73—15 |
| 3,187,568 | 6/1965 | Gonsalves et al. | 73—160 |
| 3,303,698 | 2/1967 | Leopfe | 73—160 |

LOUIS R. PRINCE, *Primary Examiner.*

M. J. NOLTON, *Assistant Examiner.*

U.S. Cl. X.R.

73—15; 324—65